Figure 1:
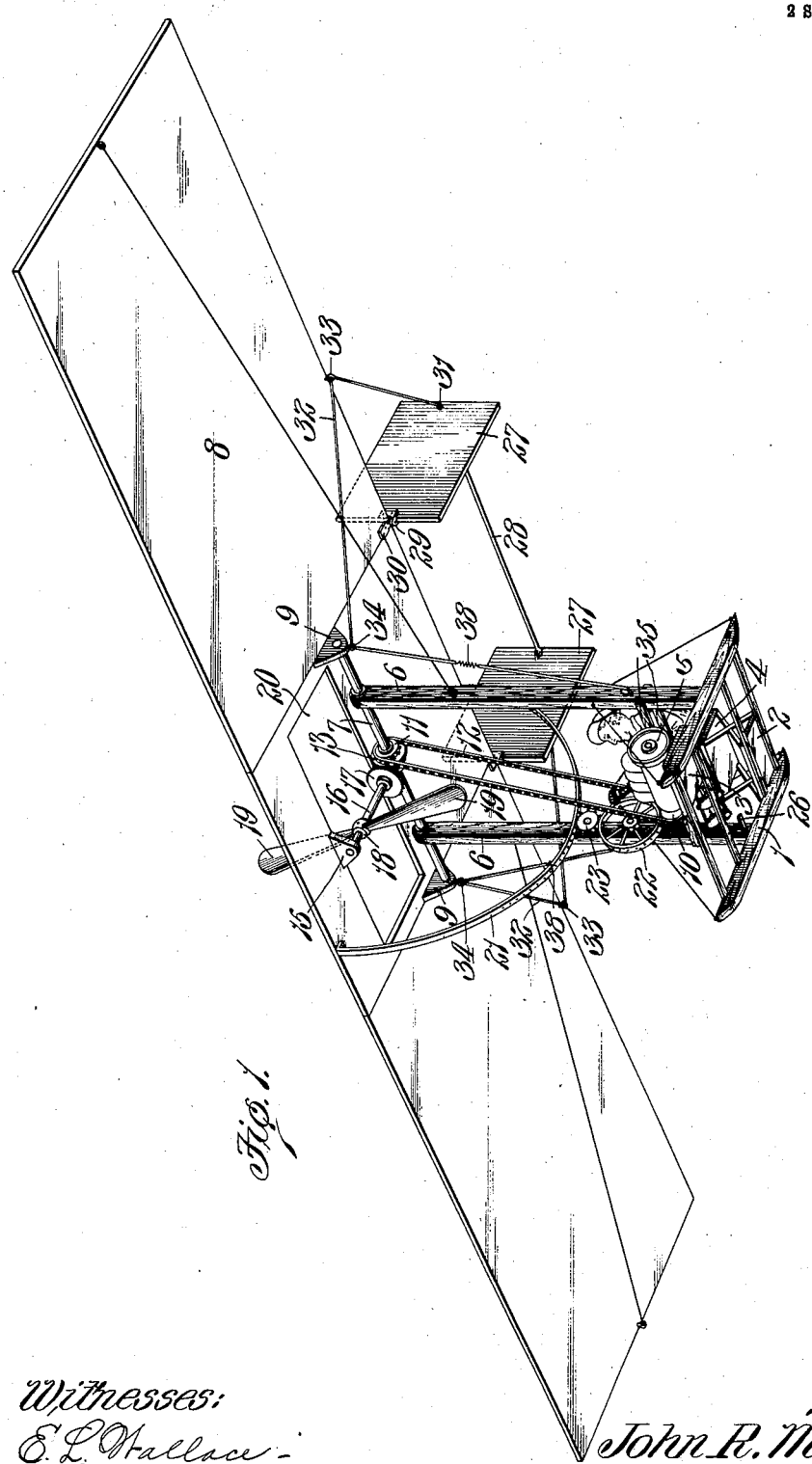

J. R. MARTIN.
AEROPLANE.
APPLICATION FILED NOV. 25, 1910.

1,037,278.

Patented Sept. 3, 1912.
2 SHEETS—SHEET 1.

Witnesses:
E. L. Wallace
N. G. Butler

Inventor,
John R. Martin.
By Higdon Longan Attys.

J. R. MARTIN.
AEROPLANE.
APPLICATION FILED NOV. 25, 1910.
1,037,278.
Patented Sept. 3, 1912.
2 SHEETS—SHEET 2.
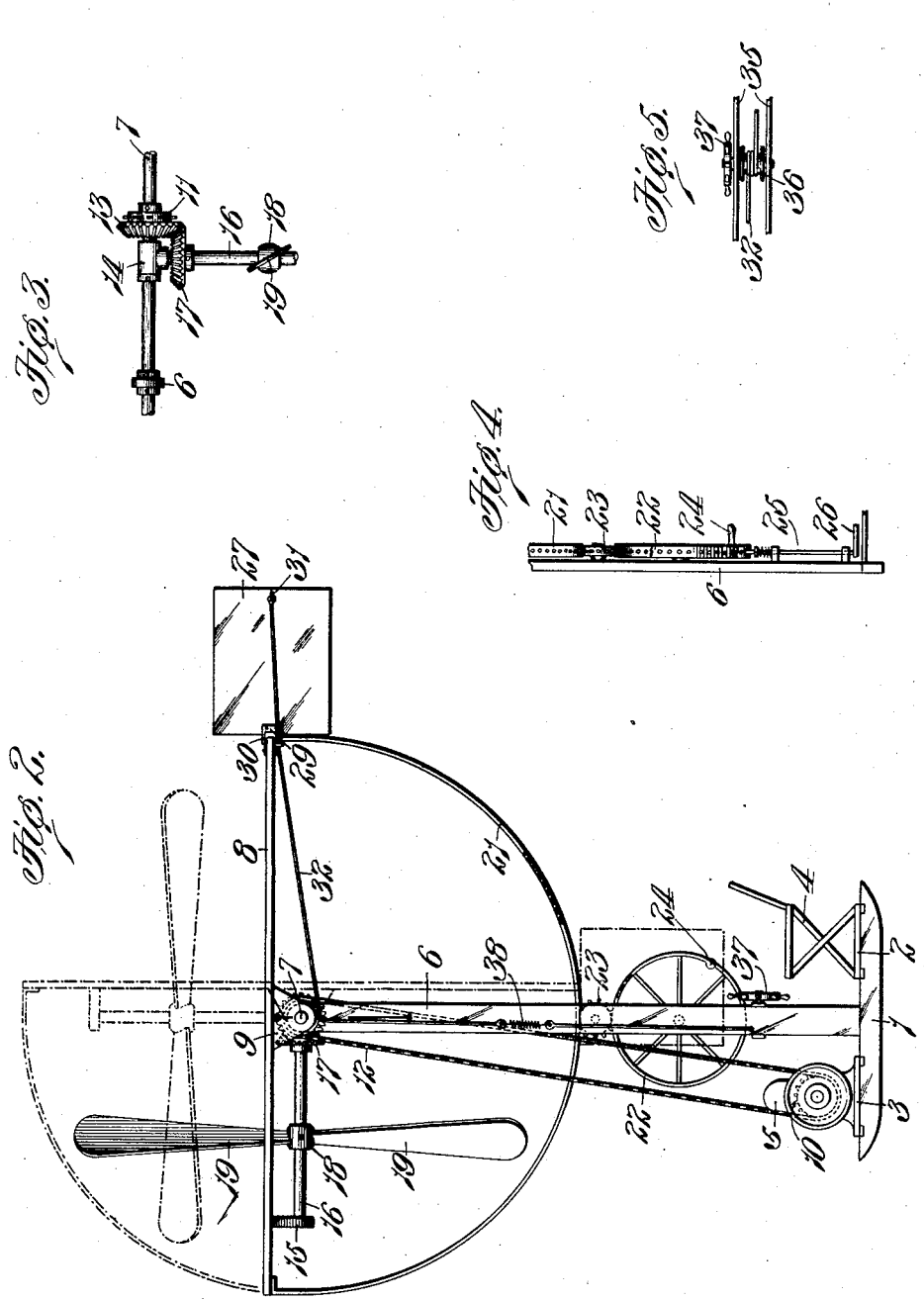
Witnesses:
E. L. Wallace
N. G. Butler
Inventor,
John R. Martin.
By Higdon Longan Atty.

UNITED STATES PATENT OFFICE.

JOHN R. MARTIN, OF ST. LOUIS, MISSOURI.

AEROPLANE.

1,037,278.  Specification of Letters Patent.  Patented Sept. 3, 1912.

Application filed November 25, 1910. Serial No. 594,027.

*To all whom it may concern:*

Be it known that I, JOHN R. MARTIN, a citizen of the United States, and resident of St. Louis, Missouri, have invented certain new and useful Improvements in Aeroplanes, of which the following is a specification containing a full, clear, and exact description, reference being had to the accompanying drawings, forming a part hereof.

My invention relates to improvements in aeroplanes, the object of my invention being to construct a heavier-than-air flying machine having a plane which is movable with respect to the passenger and motor-carrying frame and which plane carries a propeller so that, when the plane is in a substantially vertical position and the propeller set in operation, the entire machine will be elevated and when the plane is shifted to a substantially horizontal, or flying, position the propeller advances the entire machine.

With the above object in view my invention consists in certain novel features of construction and arrangement of parts as will be hereinafter more fully described, pointed out in the claims and illustrated by the accompanying drawing, in which—

Figure 1 is a perspective of the complete machine, the plane being in a flying position: Fig. 2 is an end view of the complete machine, the plane being in a horizontal or flying position, and in the same figure there is illustrated by dotted lines the plane and propeller in a position permitting the propeller to elevate the machine; Fig. 3 is a detail plan of the gearing employed to rotate the propeller; Fig. 4 is a detail elevation of a portion of the means for varying the inclination of the plane; and Fig. 5 is a detail plan of the means for actuating the steering devices.

Referring by numerals to the accompanying drawings: 1 designates the base of the machine upon which there is located a platform 2 and a second platform 3, the platform 2 having secured thereto a passenger-carrying stool or chair 4 and the platform 3 having secured thereon a motor 5.

6—6 designate standards which are rigidly secured to the base 1. Journaled for rotation in the upper ends of the standards 6 is a shaft.

8 designates the plane which is secured for rotation with the shaft 7 by means of the bearings 9, which bearings are rigidly secured to the plane and to the shaft 7.

Carried by the motor is a sprocket wheel 10 and carried by the shaft 7, preferably alining with the wheel 10, is a sprocket wheel 11, which wheels 10 and 11 are connected by a sprocket chain 12. Carried by the shaft 7 and secured for rotation with the sprocket wheel 11 is a bevel gear wheel 13. Carried by the shaft 7, immediately adjacent the bevel gear wheel 13, is a T-coupling 14, and carried by the plane 8 is a bearing 15. Mounted for rotation in a bearing formed in the end of the T-coupling 14 and in the bearing 15 is a shaft 16 which is arranged approximately at right angles to the driving shaft 7. Carried by the shaft 16 and secured thereto is a bevel gear wheel 17 meshing with the bevel gear wheel 13. Secured for rotation upon the shaft 16 is a hub 18 having thereon the blades 19, which blades operate through an opening 20 formed in the plane 8.

It is obvious by the construction of the mounting for the plane 8 that the same may be tilted with respect to the passenger and motor-carrying frame. The tilting apparatus comprises a perforated, segmental rack 21 secured to the plane, a perforated wheel 22 secured to one of the standards 6, and a toothed wheel 23 intermediate the rack 21 and wheel 22, the wheel 22 being provided with a projecting handle 24 which is grasped by the operator when it is desired to move the plane.

In order that the wheel 22 may be locked in any desired position to effect a locking of the plane, I have provided a spring actuated, locking-bolt 25 which is supported on one of the standards 6, adjacent the wheel 22 and in position so that it will enter one of the perforations in said wheel. The bolt is connected with a treadle 26, which treadle is at a point conveniently accessible to the operator's foot.

While I do not wish to be understood as limiting myself to the specific construction of the steering apparatus shown, I prefer to employ the simple contrivance as illustrated and which comprises two rudders 27 which are interconnected by means of the rod 28 pivotally connected with each rudder. Carried by each of the rudders is a hinge member 29 which is pivotally connected with a hinge member 30 carried by the plane 8, and the rudder is preferably hung so that it projects above and below the plane 8. To each of the rudders 27 is connected, by means of screw eyes 31, or the like, a flexible member such as a rope or cable 32 which extends through screw eyes 33 carried by the plane 8 and screw eyes 34 secured to the bearing blocks 9. Carried by cross arms 35 and located conveniently accessible to the operator is a drum 36 around which the cable 32 is wrapped a number of times and connected with the shaft which supports the drum is a hand operating wheel 37. It is obvious that upon a rotation of the hand wheel 37 the drum will be moved and through the medium of the cables the machine may be steered by varying the angle of the rudders. At a convenient location within the length of each cable there is a retractile coil spring 38 for the purpose of taking up the slack in the cables when the plane is shifted from one position to another.

In the practical operation of the machine assuming the plane and propelling blades to be in position shown in dotted lines in Fig. 2, that is with the plane in a substantially vertical position, it is obvious that, upon setting the motor in motion, the propeller will lift the entire machine to a height as required to safely shift the plane to a substantially horizontal or flying position, whereupon a continued rotation of the propeller will advance the machine through the air in an ordinary manner.

I am aware that heretofore there has been a number of flying machines employing propellers for elevating the machine, hence, do not claim broadly the application of an elevating or lifting propeller to a flying machine.

By the arrangement of the propeller, to be carried by a shifting plane, the machine is simplified for the reason that a single propeller is employed for the lifting or elevating of the machine and the propelling of the machine through the air.

I claim:

1. In a heavier than air flying machine, a plane, a segmental rack carried by the plane, a car suspended from said plane, a gear, carried by the car, in mesh with said rack whereby the plane may be shifted from a vertical to a flying position, a propeller carried by the plane, a motor for operating the propeller, a steering device carried by the plane, and means for operating said steering device, whereby a single propeller may be employed to lift the entire machine from the ground in a vertical course to a flying position then propel the machine in flight.

2. In a heavier than air flying machine, a passenger and motor carrying frame, a plane pivotally mounted upon said frame, a propeller carried by said plane, a rack carried by the plane, a gear carried by the frame for varying the angle of the plane from a vertical to a flying or approximately horizontal position, a motor for the propeller, and a gear connection from the motor to the propeller whereby the angle of the plane and propeller may be changed without stopping the motor.

3. In a heavier than air flying machine, a plane, alining bearings secured to the underneath face of the plane at its approximate longitudinal center, hangers pivotally secured to said bearings, a car carried by said hangers, a propeller mounted in fixed bearings upon the plane, a segmental rack carried by the plane, and a gear carried by the car for engagement with the rack for shifting the plane from a horizontal to a vertical position and vice-versa, whereby the same propeller may be employed to lift the car bodily in a vertical course to a flying position, then after the plane is shifted propel the car as in flight.

In testimony whereof, I have signed my name to this specification, in presence of two subscribing witnesses.

JOHN R. MARTIN.

Witnesses:
 E. L. WALLACE,
 N. G. BUTLER.